Sept. 8, 1970 W. E. JOHNSTON 3,527,891
SELECTOR CIRCUIT
Original Filed March 9, 1967
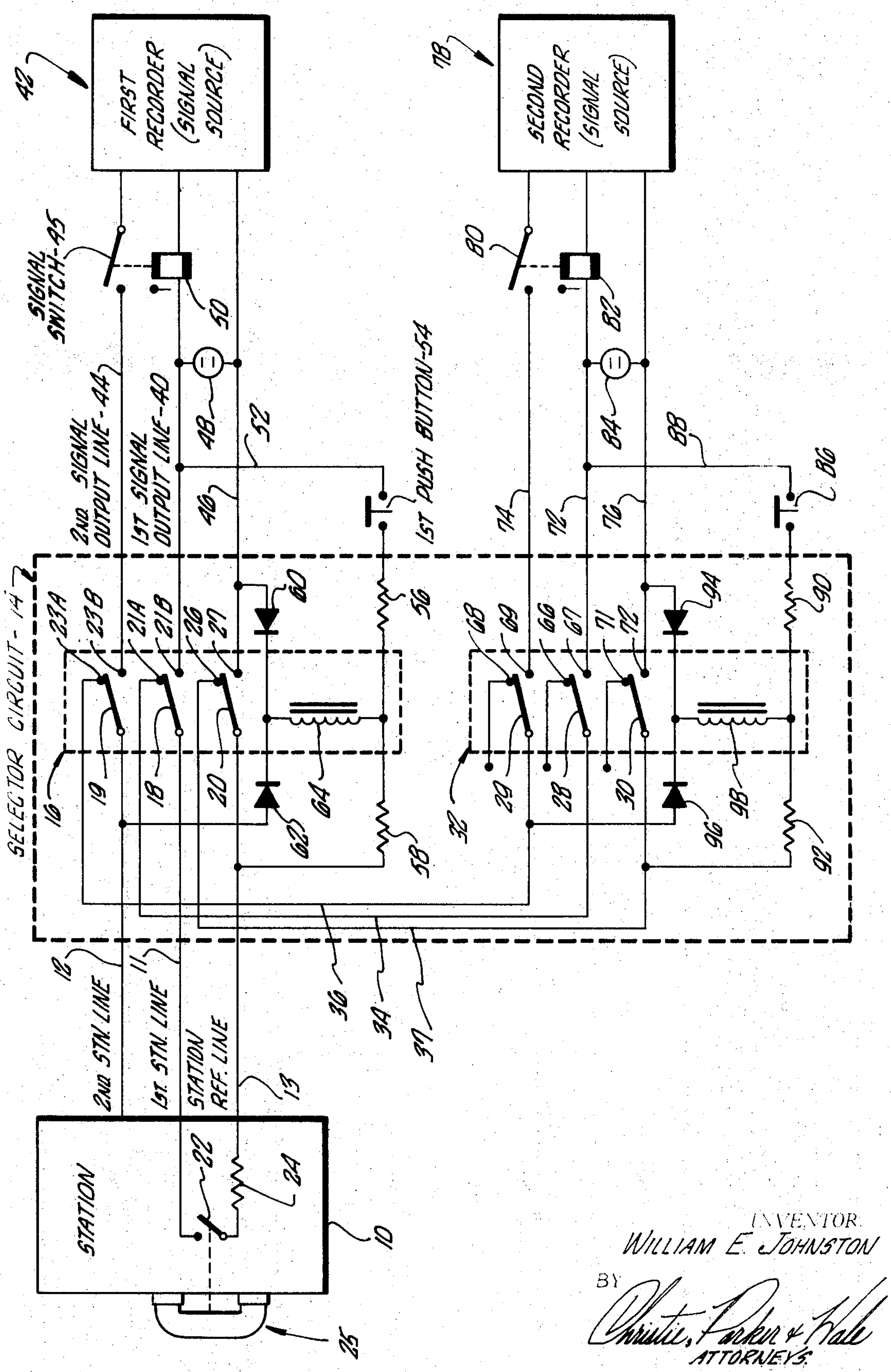
INVENTOR.
WILLIAM E. JOHNSTON
BY Christie, Parker & Hale
ATTORNEYS.

United States Patent Office 3,527,891
Patented Sept. 8, 1970

3,527,891
SELECTOR CIRCUIT
William E. Johnston, 4608 Coyle Place,
Woodland Hills, Calif. 91364
Continuation of application Ser. No. 621,934, Mar. 9, 1967. This application Nov. 24, 1969, Ser. No. 872,471
Int. Cl. H04j *11/10*
U.S. Cl. 179—2 2 Claims

ABSTRACT OF THE DISCLOSURE

A transmitting station, such as a telephone hand set, is automatically connected to any one of several receivers such as dictation recording systems. Each receiver can supply two different signals. One signal indicates the receiver is in use. The other signal indicates the receiver is available and operates the selector circuit to connect the available recorder to the station. When the recorder is so selected, it automatically transmits the signal to indicate it is in use, and discontinues the signal indicating the recorder is available.

This is a continuation of Ser. No. 621,934, filed Mar. 9, 1967 and now abandoned.

This invention relates to a circuit for selectively connecting a station, such as a microphone, to any one of several receivers, such as dictation recording systems.

Multistation remotely-controlled dictation recording systems are finding increasing acceptance where maximum availability and utilization of recording equipment is required.

A typical example is a central dictation system in which a number of sound recorders are mounted in a common area, such as in a hospital. The recorders are arranged to be connected to any one of a number of telephone hand sets located in various offices throughout the building. Dictation is recorded from any telephone by simply picking up the hand set, pushing a button and talking.

An important requirement of such a system is that one dictator does not interrupt or cut off the dictation of another. Various types of circuits have been devised for automatically connecting a telephone to a remotely located receiver or sound recorder. For example, U.S. Pat. 2,833,865 shows such a circuit which uses a drive motor and stepping switches to connect a dictator's telephone to a recorder which is not in use. Such a circuit is relatively expensive to install and maintain. This invention provides a simpler and less expensive circuit which automatically selects from a group of recorders one which is not in use and connects it to the dictators' telephone for dictation.

Briefly, the selector circuit connects a station, such as a telephone hand set, to either a first or second signal source, which may be a conventional sound recorder that emits a signal when it is ready for use. The selector circuit includes first and second switching means. The first switching means is arranged to move from a first condition, at which it connects the station to the second switching means, to a second condition, at which it connects the station to the first signal source. The second switching means is arranged to move from a first condition to a second condition to connect the second signal source to the station when the first switching means is in the first condition.

Preferably, each signal source supplies a respective first signal of one characteristic before the source is connected by the selector circuit to the station, and a second respective signal of a different characteristic after the signal source is connected by the selector circuit to the station. Means are provided for changing the signal output from each source from the first to the second signal when a switching means in the selector circuit connects it to the station. Means responsive to the second signal hold the signal source connected to the station.

Preferably, the selector circuit includes separate means for sensing the signal output from each source, and means responsive to the first signal for actuating the selector circuit to connect the station to any signal source generating the first signal. Means are also provided for switching the signal output from each source back from the second to the first signal when the station no longer requires the use of the signal source or recorder. Visual means are provided at the station for indicating when a signal source or recorder is available for connection through the selector circuit to the station.

These and other aspects of the invention will be more fully understood from the following detailed description and the accompanying drawing which is a schematic circuit diagram of the presently preferred embodiment of the invention.

A station 10, which may be a conventional telephone, is connected by a first station line 11, a second station line 12, and a station reference line 13 to a selector circuit 14 which includes a first selector relay 16 with a first armature 18, a second armature 19, and a third armature 20.

The first armature is connected to the lrst station line and arranged to move between a first pair of contacts which include a first contact 21A and a second contact 21B.

The second armature 19 is connected to the second station line 12 and arranged to move between a second pair of contacts which includes a first contact 23A and a second contact 23B.

A third armature 20 is connected to the station reference line 13 which is connected in series with a station resistor 24 to a station hook switch 22, which connects the reference line to the first station line through the station resistor when hook switch 22 is closed, such as in lifting a telephone hand set 25. The third armature is adapted to move between a third pair of contacts which includes a first contact 26 and a second contact 27.

The first contacts in each of the first, second, and third pairs of contacts in the first selector relay are connected, respectively, to a first armature 28, a second armature 29, and a third armature 30 in a second selector relay 32 by lines 34, 36, and 37, respectively.

The second contact 22 in the first pair of contacts of the first selector relay is connected by a first signal output line 40 to a first signal source 42, which may be a conventional sound recorder, such as the "Tel-Expeditor IV," sold by Stenocord Corporation. The first contact 23A of the second pair of contacts in the first selector relay is connected by a second signal output line 44 through a first signal switch 45 to the first signal source. The second contact 27 of the third pair of contacts in the first selector relay is connected by a signal reference line 46 to the first signal source.

When the first signal source is available for use, a first signal of one characteristic is standing on the first signal output line 40. For convenience of decription, it is assumed the first signal source is a "Tel-Expeditor IV" tape recorder. With such a recorder, the voltage on the first signal output line is normally −100 volts with respect to the signal reference line 46 as long as the recorder is available for use. A neon lamp 48 is connected across the first signal output line and the signal reference line. The lamp requires about 100 volts to light it, and it extinguishes if the voltage drops significantly, say to less than 60 volts. The lamp is visible at the hand set so a dictator can tell at a glance if a recorder is available for dictation.

A first signal switch relay 50 is connected in series in the first signal output line. The first signal switch relay normally holds the signal switch 45 open, because in the condition shown in the drawing, no current flows through the relay. If current is drawn through the first signal switch relay, as described below, the first signal switch relay is energized and closes signal switch 45, applying +100 volts to the second signal output line 44.

A first jumper line 52 is connected from the first signal output line in series with a first push button 54, a first resistor 56, and a second resistor 58 to the station reference line 13. The anode of a first diode 60 is connected to the signal reference line. The cathode of the first diode is connected to the cathode of a second diode 62 having its anode connected to the second armature in the first selector relay.

One end of a solenoid winding 64 of the first selector relay is connected between the first and second resistors. The other end of the winding is connected between the two diodes. With the solenoid winding of the first selector relay in the de-energized state, the armatures are in the position shown, i.e. each armature is against its respective first contact. The first selector relay requires less current to energize it than the first signal switch relay to prevent false operation of the selector circuit, as explained below.

Referring to the second selector relay, the first, second and third armatures are each arranged to move between a respective pair of contacts which include first and second contacts 66, 67 for the first armature, first and second contacts 68, 69 for the second armature, and first and second contacts 70, 71, respectively, for the third armature. The second contact 67 of the first relay, the second contact 69 of the second relay and the second contact 71 of the third relay are each respectively connected to a first signal output line 72, a second signal output line 74, and a second signal reference line 76, each of which is connected to a second recorder 78 identical with the first recorder. A second signal switch 80 is in the second signal output line 74 and operated by a second signal switch relay 82 connected in series in the first signal line 72. A neon lamp 84 is connected across the first signal line 72 of the second signal source and the second signal reference line 76. A second push button 86 in a second jumper line 88 connected to the first signal line 72 is adapted to connect the signal line 72 in series with a resistor 90 and a resistor 92 to the third armature 30 of the second selector relay. For convenience, push buttons 54 and 86 may be gauged together for simultaneous operation. A second pair of diodes 94 and 96 are connected across the second signal reference line 76 and the second armature 29 of the second selector relay with their cathodes connected to a common point at one end of a solenoid winding 98 of the second selector relay. The other end of the solenoid winding 98 is connected between the two resistors 90 and 92.

The armatures of the second selector relay are in the position shown against their respective first contacts when the second selector relay is in the de-energized position.

For simplicity, only two signal sources or recorders are shown. Additional selector relays and signal sources can be added to the circuit up to any required or desired number. Moreover, any number of additional stations and their respective selector circuits can be connected to the first and second signal sources as shown in the diagram. However, for simplicity, only one station and selector circuit is shown connected to the first and second signal sources.

THE OPERATION OF THE CIRCUIT

To use the selector circuit, a dictator picks up the telephone hand set, causing hook switch 22 to close and connect station resistor 24 across the reference line and the first station line. The dictator closes the push button switches 54 and 86. If the first recorder is available for use, −100 volts on the first signal output line is applied through the first resistor 56, the solenoid winding, and returns through the first diode 60. This produces a sufficient amount of current through the first solenoid winding to energize the first selector relay and swing the armatures from the position shown in the drawing (the first condition) to a second condition in which the armatures each contact the second contacts in their respective pairs. The internal impedance in the first recorder is sufficiently high for the −100 volt signal that the voltage in the first signal output line drops to about −40 volts. This is still sufficient to keep the first selector relay energized, but it is not adequate to energize the relay from a de-energized condition. Sufficient current now flows through the first signal switch relay 50 to energize it, closing the first signal switch 45 to apply +100 volts to the second signal output line 44 which is now connected through second contact 23B, second armature 19, the second diode 62, the solenoid winding 64, second resistor 58, third armature 20, second contact 27, to signal reference line 46. The resistance of the second resistor is about 22K ohms, which limits the current flowing through the second solenoid but not to such a small value that the first selector relay is de-energized. The resistance of the resistor is normally about 2.2K ohms, which is sufficiently low to allow enough current to flow through the solenoid when the push button is closed. The first recorder is now "seized" by the station, and is ready to receive dictation. As long as it is in this condition, the voltage on the first signal output line is about −40 volts, and the voltage on the second signal output line is about +100 volts. Under these conditions, no other station can cut in or "seize" the first recorder.

To complete the explanation of how the circuit operates, assume that the first recorder had been "seized" by another station prior to the time the push buttons were closed by the operator. The relay armatures would be in the position shown in the drawing. However, the first signal output line would have only −40 volts on it. This would not be enough to energize the first selector relay in the selector circuit. Accordingly, the first selector relay armatures would remain in the position shown in the drawing. However, assume that the second recorder was available for recording. The −100 volts on the first signal output line of the second recorder actuates the second selector relay, causing the second selector relay armatures to move from the position shown to the second condition, i.e. against their second respective contacts. This causes the voltage in the first signal output line of the second recorder to drop to about −40 volts and turn on the +100 volts in the second signal output line of the second recorder. This holds the second selector relay energized by current flowing through the second diode 96, the solenoid winding resistor 92, armature 30, and signal reference line 76. The second recorder is now connected through the contacts in the first and second selector relays to the station, and dictation can proceed.

When the second selector relay is actuated to "seize" the second recorder, +100 volts is applied through the second armature of the first selector relay to the de-energized solenoid winding. However, the first selector relay is not actuated because the second resistor limits the current below that required to operate the relay, although the current is sufficient to hold the relay closed once it is actuated.

When the dictator is through and replaces the hand set, hook switch 22 opens, causing voltage to rise on the first signal output line from −40 volts to about −100 volts. This opening of switch 22 also interrupts current through the signal switch relay, opening the signal switch and removing the +100 volts from the second signal output line. This permits the selector relay to drop back to its de-energized position, and the recorder is now ready for use by another station, or the same station on reclosing of hook switch 22.

The first resistors 56 and 90 prevent the false operation of either of the selector relays if a push button should be depressed without the hook switch 22 being closed, because the first selector relay is energized with less current than the first signal switch relay. For example, if push button 54 is closed with hook switch 22 open, voltage is applied from the first signal line to the solenoid windings in the first selector relay and the first signal switch relay. However, the first resistor 56 limits the current sufficiently to prevent the energization of the first signal switch relay, but there is sufficient current to energize the first selector relay. Thus, even though the armatures in the first selector relay move to their respective second positions, the signal switch 45 is not closed so the first selector relay is not locked in an energized position by the +100 volts from the signal output line. As soon as the first push button 54 is released, the first selector relay returns to the normal de-energized position shown in the drawing. If the hook switch 22 is closed when a push button switch is closed, normal operation occurs because then current from the first signal line passes through the station resistor 24 which has a relatively low value of only 500 ohms. This permits adequate current to flow through the signal switch relay to energize it and close the signal switch to hold the first selector relay in a closed condition. The second selector relay follows the same operation just described for the first selector relay to prevent the second relay from operating falsely.

From the foregoing description, it will be readily understood that the number of selector relays can be increased indefinitely as can the number of recorders or signal sources. Moreover, any number of stations or telephones with their respective selector circuits can be connected to the recorders or signal sources.

I claim:

1. A selector circuit for connecting a station to a first or second signal source, the selector circuit comprising first and second switching means, the first switching means being arranged to move from a first condition at which it connects the station to the second switching means and disconnects the station from the first signal source to a second condition at which it connects the station to the first signal source, the second switching means being arranged to move from a first condition to a second condition to connect the second signal source to the station when the first switching means is in the first condition, means for providing a signal from each signal source to the selector circuit, means for altering each signal from a first characteristic when it is not connected to the station to a second characteristic different from the first when it is connected to the station, each signal at its first characteristic being adequate to move each switching means from its respective first condition to its respective second condition, and inadequate in its second characteristic to move either switching means from its respective first condition to its respective second condition, means responsive to either signal at its first characteristic for connecting one of the signal sources through one of the switching means to the station, and means responsive to the signal from the said one connected signal source for holding the said one switching means in a condition to keep the said one signal source connected to the station.

2. A circuit according to claim 1 which includes means responsive to either of the signals in their respective second characteristics for applying to the selected one switching means another signal to the selected one switching means and keeping the one signal source connected to the station.

References Cited

UNITED STATES PATENTS

| | | | |
|---|---|---|---|
| 1,926,172 | 9/1933 | Perry | 178—4.1 |
| 3,328,536 | 1/1967 | Bolick. | |

OTHER REFERENCES

IBM Technical Disclosure, vol. 7, No. 10, March 1965.

RALPH D. BLAKESLEE, Primary Examiner

U.S. Cl. X.R.

178—4.1; 179—6, 100; 317—139